(12) United States Patent
Roemen et al.

(10) Patent No.: US 6,289,756 B1
(45) Date of Patent: Sep. 18, 2001

(54) ELECTRONIC SHIFTER ASSEMBLY WITH POSITIONING MECHANISM TO AID IN SETTING SHIFT LEVER TO DESIRED GEAR SETTING

(75) Inventors: Joseph John Roemen; William James Falkowski, both of Winona, MN (US)

(73) Assignee: Kelsey-Hayes Co., Livonia, MI (US)

( * ) Notice: Subject to any disclaimer, the term of this patent is extended or adjusted under 35 U.S.C. 154(b) by 0 days.

(21) Appl. No.: 09/489,122

(22) Filed: Jan. 21, 2000

(51) Int. Cl.[7] .................................................. F16H 59/02
(52) U.S. Cl. ..................... 74/335; 74/473.12; 74/473.28
(58) Field of Search ................................ 74/335, 473.12, 74/473.27, 473.28

(56) References Cited

U.S. PATENT DOCUMENTS

| | | | |
|---|---|---|---|
| 4,022,078 | * | 5/1977 | Malott .................................. 74/473.3 |
| 4,519,266 | * | 5/1985 | Reinecke ........................ 74/473.33 X |
| 4,610,179 | * | 9/1986 | Parker ...................................... 74/335 |
| 5,309,783 | * | 5/1994 | Doolittle et al. .................. 74/473.21 |
| 5,453,732 | * | 9/1995 | Takano .......................... 74/473.36 X |
| 5,799,538 | * | 9/1998 | DeJonge et al. ..................... 74/473.3 |
| 6,018,294 | * | 1/2000 | Vogel et al. ......................... 340/456 |
| 6,073,511 | * | 6/2000 | Umezawa et al. ................ 74/473.25 |

* cited by examiner

Primary Examiner—Allan D. Herrmann
(74) Attorney, Agent, or Firm—Harness, Dickey & Pierce, P.L.C.

(57) ABSTRACT

An electronic shifter assembly is provided. The shifter assembly includes a shift lever, a position sensor and first and second mechanisms. The position sensor is operable for sensing a position of the shift lever and producing a position signal in response thereto. The first mechanism is coupled to one of the position sensor and the shift lever and includes a structure having a plurality of detents. The second mechanism is coupled to the other one of the position sensor and the shift lever and includes an assembly which engages the plurality of detents to resist relative movement between the shift lever and the position sensor.

10 Claims, 4 Drawing Sheets

ELECTRONIC SHIFTER ASSEMBLY WITH POSITIONING MECHANISM TO AID IN SETTING SHIFT LEVER TO DESIRED GEAR SETTING

BACKGROUND OF THE INVENTION

1. Technical Field

The present invention relates generally to transmission shifting systems and more particularly to an electronic shifter assembly.

2. Discussion

Modern automotive vehicles having automatic transmissions typically employ a mechanical shifter assembly which controls the transmission. Such shifters typically employ a shift lever which may be rotated between several gear settings. While such configurations are widely used, several drawbacks have been noted.

One such drawback concerns the mechanical linkage between the gear shift lever and the spool valve lever. Due in part to manufacturing and assembly tolerances, the mechanical linkage from the gear shift lever can become misaligned to the spool valve lever, impairing the vehicle operator's ability to select a desired gear setting or inhibiting the operation of the vehicle. In such situations, it is necessary to adjust the linkage which is frequently costly due to the amount of labor involved.

To eliminate these and other drawbacks associated with mechanical shifter assemblies, it is proposed that an electronic shifter assembly be used to shift the transmission into a desired gear setting. Such shifter assemblies include a shift lever and a plurality of switches to detect the position of the shift lever. The signal from the plurality of switches is indicative of the position of the shift lever and is employed to control the gear setting into which the transmission is placed.

A drawback associated with this approach concerns the ease with which the vehicle operator is able to set the shifter assembly into a desired gear setting. Unlike the mechanical shifter assemblies, the electronic shifter assembly provides little "feedback" to the vehicle operator, either by sound or by feel, which can be related to the relative position of the shift lever. Consequently, in shifting such electronic shifter assemblies the vehicle operator is forced to watch a light display to both determine the position of the shift lever and "hunt" for a desired shift lever position.

SUMMARY OF THE INVENTION

It is one object of the present invention to provide an electronic shifter assembly which provides the vehicle operator with tactile feedback to aid in the setting of the shifter assembly to a desired gear setting.

An electronic shifter assembly is provided. The shifter assembly includes a shift lever, a position sensor and first and second mechanisms. The position sensor is operable for sensing a position of the shift lever and producing a position signal in response thereto. The first mechanism is coupled to one of the position sensor and the shift lever and includes a structure having a plurality of detents. The second mechanism is coupled to the other one of the position sensor and the shift lever and includes an assembly which engages the plurality of detents to resist relative movement between the shift lever and the position sensor.

Additional advantages and features of the present invention will become apparent from the subsequent description and the appended claims, taken in conjunction with the accompanying drawings.

DETAILED DESCRIPTION OF THE PREFERRED EMBODIMENT

Figure 1A:
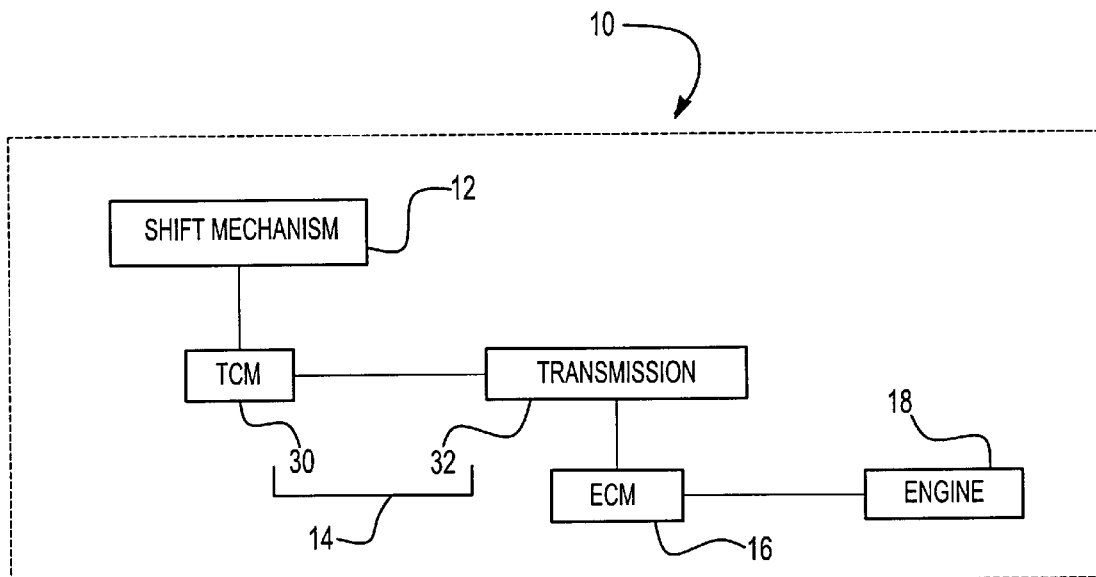
FIG. 1A and 1B are schematic illustration of a vehicle constructed in accordance with the teachings of the present invention.
Figure 1B:
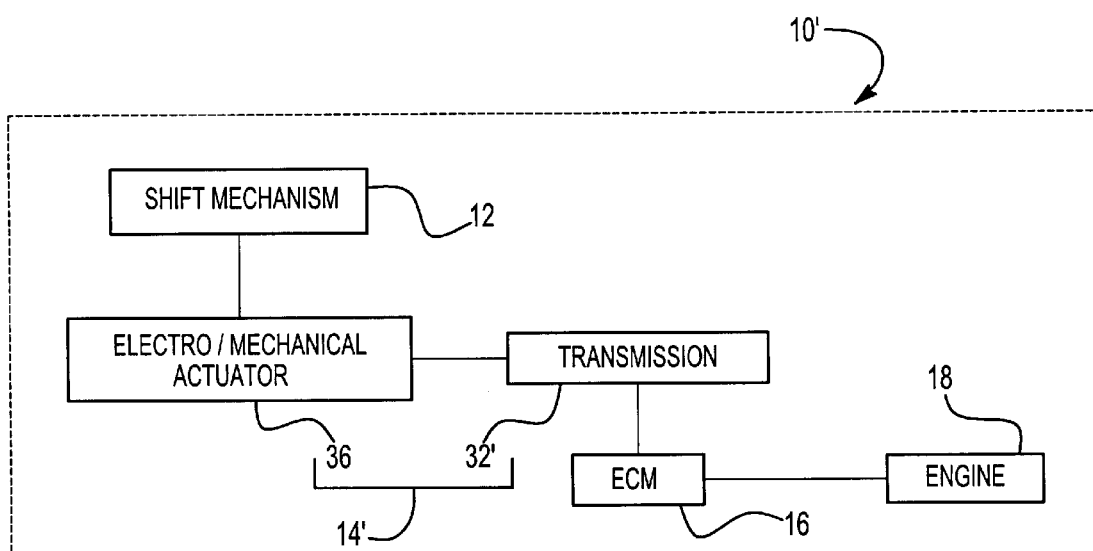

With reference to FIG. 1A of the drawings, a vehicle constructed in accordance with the teachings of the present invention is generally indicated by reference numeral 10. Vehicle 10 is shown to include a shifter assembly 12, an automatic transmission assembly 14, a engine control module 16 and an engine 18. Automatic transmission assembly 14 is shown to include a transmission control module 30 and an automatic transmission 32. Transmission control module 30 and shifter assembly 12 are electrically coupled to one another. Alternatively, as shown in FIG. 1B, automatic transmission assembly 14' may be configured to include one or more electro-mechanical actuators 36 and an automatic transmission 32'. In this particular embodiment, shifter assembly 12 is electrically coupled to the electro-mechanical actuators 36. Alternatively, shifter assembly may be coupled to a gear position indicator (not shown).

Figure 2:
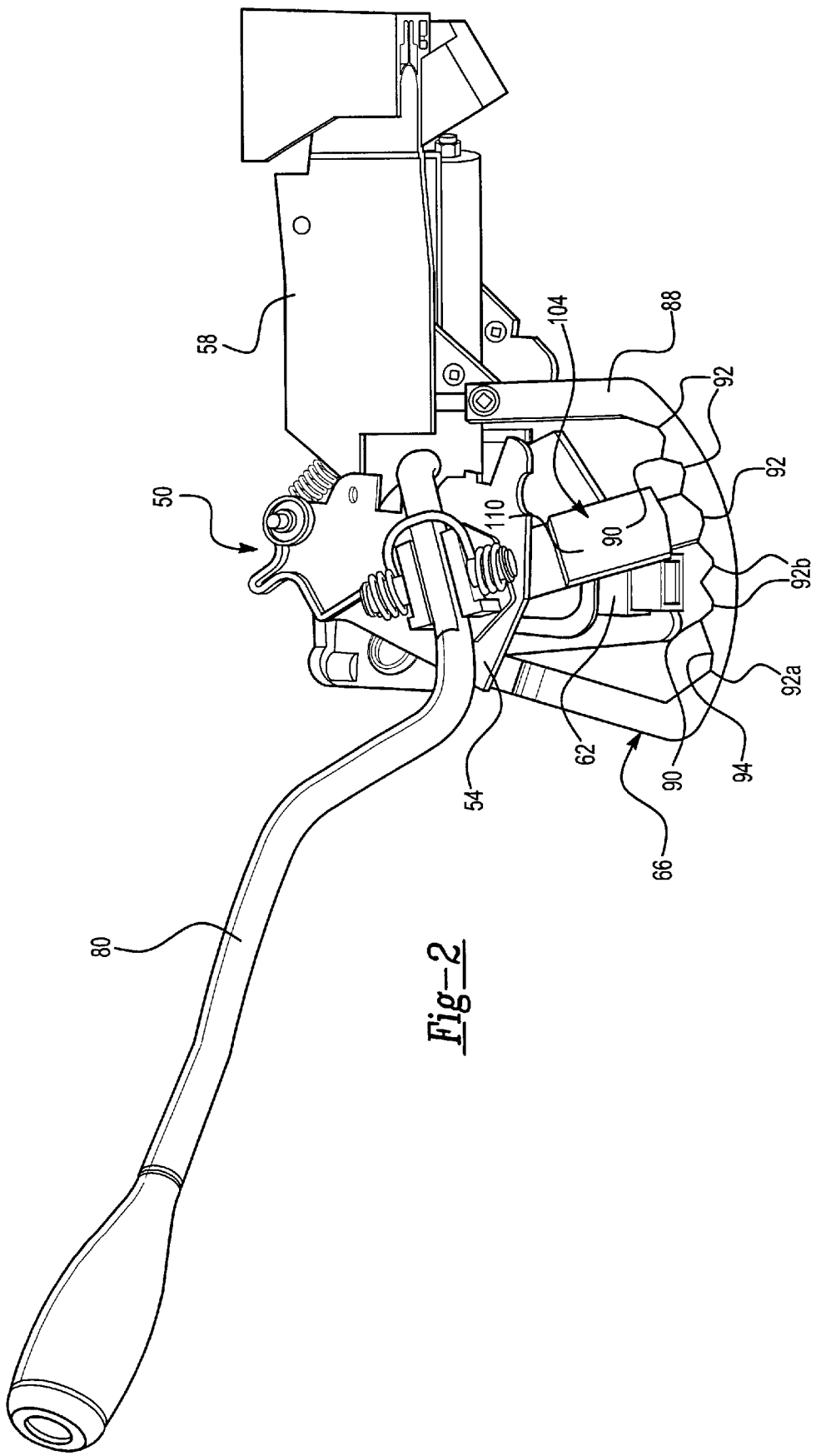
FIG. 2 is a perspective view of a shifter assembly constructed in accordance with the teachings of the present invention.
Figure 3:
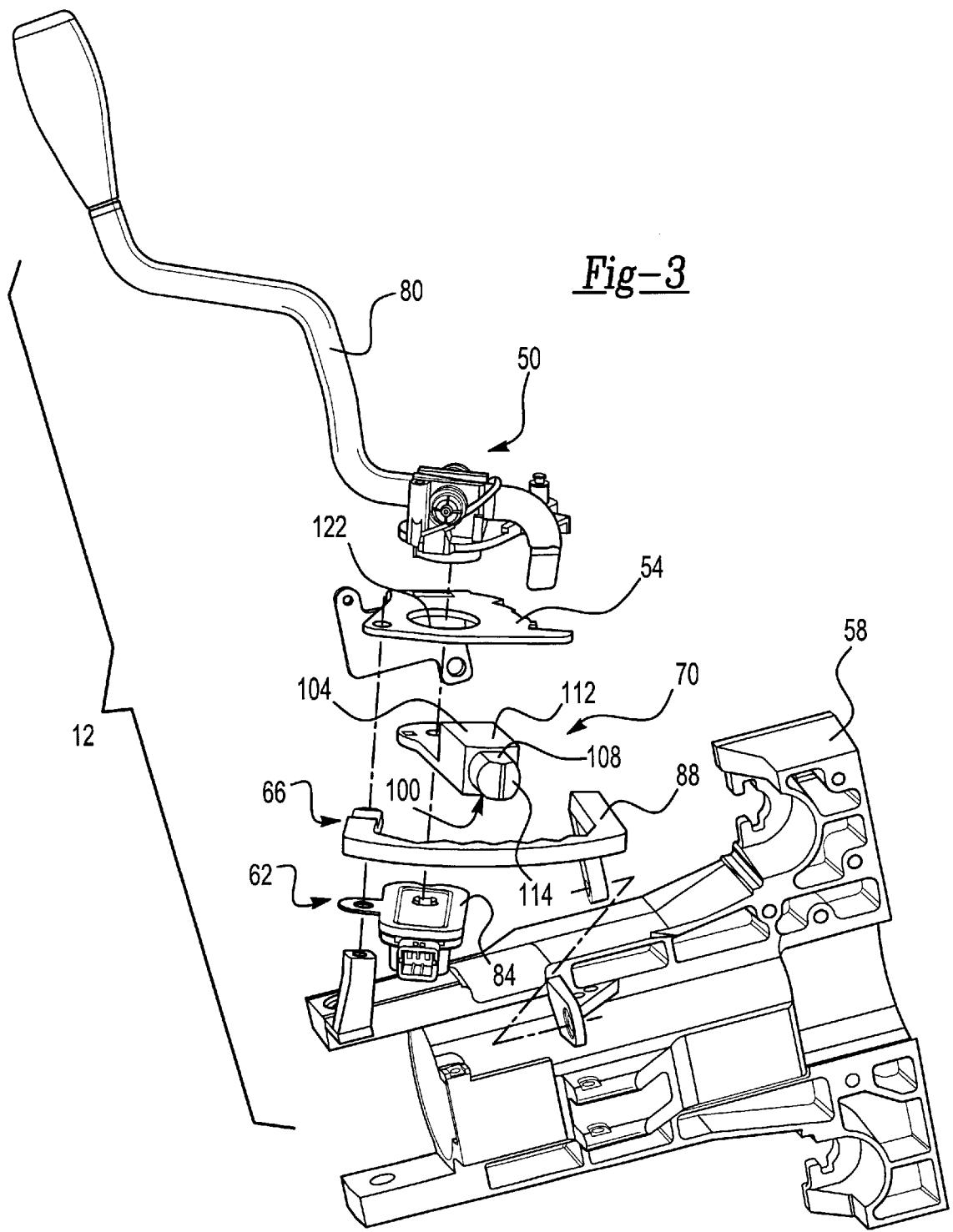
FIG. 3 is an exploded perspective view of the shifter assembly of FIG. 2.

In FIGS. 2 and 3, shifter assembly 12 is illustrated in detail. Shifter assembly 12 is shown to include a shift lever assembly 50, a bracket 54, a mounting bracket 58, a position sensor 62, a first positioning mechanism 66 and a second positioning mechanism 70. In the particular embodiment illustrated, shift lever assembly 50 includes a shift lever 80 which is adapted to be rotated about a conventional steering wheel column to permit a vehicle operator to select a desired gear setting. Those skilled in the art will readily understand that the present invention has applicability to other types of shift lever assemblies and as such, the scope of the present invention will not be limited to the particular embodiment illustrated.

Position sensor 62 is operable for detecting the position of shift lever 80 and producing a position signal in response thereto. Preferably, position sensor 62 is a Hall effect sensor 84. The position signal produced by position sensor 62 is output to the automatic transmission assembly 14 where it is received by either the transmission control module 30 or the electro-mechanical actuators 36, depending upon the configuration of vehicle 10. Alternatively, the position signal produced by position sensor 62 can be output to the gear position indicator (not shown) where it is received by either the transmission control module 30 or the electro-mechanical actuators 36.

First positioning mechanism 66 includes a bracket-like structure 88 which is fixedly coupled to position sensor 62. A plurality of peaks 90 and valleys 92 are formed into the interior surface 94 of bracket-like structure 88 which cooperate to form a plurality of detent positions which will be described in greater detail, below. The number of valleys 92 or detent positions formed into the interior surface 94 is equal to the number of gear settings to which shift lever 80 may be positioned such that each detent position 92 corresponds to a specific gear setting. First positioning mechanism 66 and position sensor 62 are coupled to mounting bracket 58 so as to be fixed in position relative to one another. In the particular embodiment illustrated, first positioning mechanism 66 and position sensor 62 are coupled to one another via a conventional fastener (not specifically shown).

Second positioning mechanism 70 includes a follower 100 which is coupled for rotation with shift lever 80 and adapted to engage the plurality of detents 92. In the particular embodiment illustrated, follower 100 includes a carrier arm 104 and a plunger 108. Carrier arm 104 includes a longitudinal body portion 110 having a plunger aperture 112. Plunger 108 is disposed in plunger aperture 112 and a spring (not specifically shown) urges plunger outward from carrier arm 104. The outboard face 114 of plunger 108 is configured to conform to the profile of the detents 92 in first positioning mechanism 66. Alternatively, plunger 108 could include a roller for engaging the plurality of detents 92.

Bracket 54 includes a mounting aperture 120 and a central aperture 122. Conventional fasteners (not shown) are employed to retain bracket 54, second positioning mechanism 70 and shift lever assembly 50 to one another such that second positioning mechanism 70 and shift lever assembly 50 are fixed relative to each other but may freely rotate within central aperture 122. Conventional fasteners (not shown) are also employed to retain bracket 54 to mounting bracket 58. Mounting bracket 58 is fixedly coupled to a suitable structure within vehicle 10 so that it remains stationary relative to the vehicle steering wheel (not specifically shown).

When a change in the gear setting is desired, the vehicle operator will apply a force to the shift lever 80 to initiate its movement. First and second positioning mechanisms 66 and 70 cooperate to inhibit, but not prevent, movement of shift lever 80 relative to position sensor 62. However, application of sufficient force to shift lever 80 will permit relative movement, causing follower 100 to disengage a first detent 92a and engage a subsequent detent 92b. In response to the placement of shift lever 80 at detent 92b, position sensor 62 produces a position signal indicative of the current position of shift lever 80 which is transmitted to the automatic transmission assembly 14. In the vehicle of FIG. 1A, the position signal is received by the transmission control module 30 which in turn generates a gear setting signal to actuate one or more electro-mechanical actuators (not shown) to shift a spool valve (not shown) to a desired position. The position signal may also be received by a gear position indicator. In such applications, a signal from the gear position indicator may alternatively be employed to cause the generation of a gear setting signal which actuates one or more electro-mechanical actuators (not shown) to shift a spool valve (not shown) to a desired position. In the vehicle of FIG. 1B, the position signal is received directly by the electro-mechanical actuators 36 to cause a spool valve (not shown) to shift to a desired position.

While the shifter assembly of the present invention has been described thus far as including a plunger coupled to the shift lever, those skilled in the art will appreciate that the invention, in its broader aspects, may be constructed somewhat differently. For example, the configuration of the first and second positioning mechanisms 66 and 70 may be changed as shown in FIG. 4 such that the first positioning mechanism 66' is fixed relative to the shift lever 80' and the second positioning mechanism 70' is fixed relative to the position sensor 62'.

Figure 4:
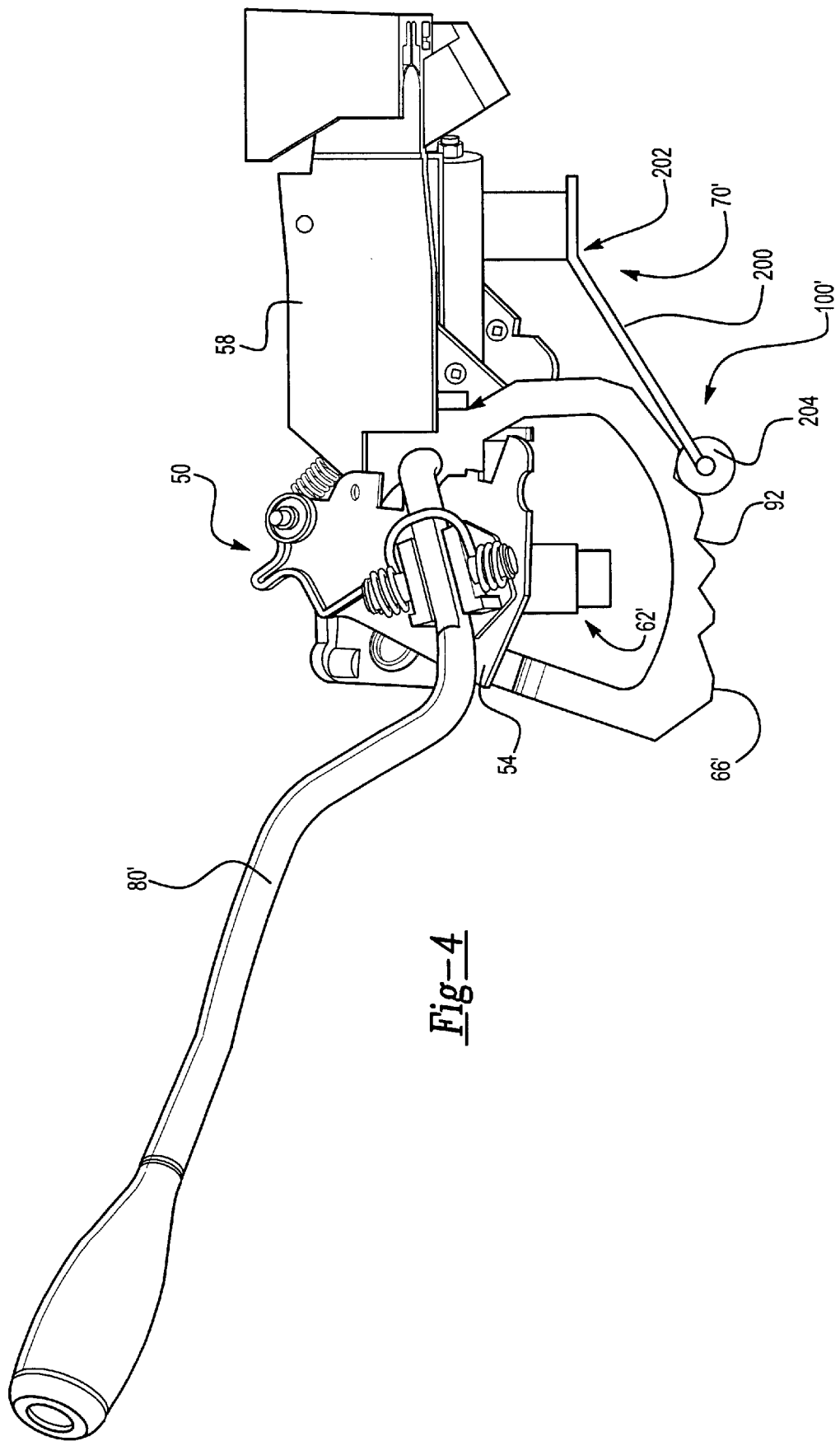
FIG. 4 is a perspective view of a shifter assembly constructed in accordance with the teachings of a second embodiment of the present invention.

As further shown in FIG. 4, second positioning mechanism 70 may be constructed with a follower of a different type. Follower 100' is shown to include a cantilever arm 200, spring means 202 and a roller 204. A first end of cantilever arm 200 is coupled to shift lever 80' and roller 204 is coupled to the second end. Spring means 202 biases cantilever arm 200 toward the plurality of detents 92.

While the invention has been described in the specification and illustrated in the drawings with reference to a preferred embodiment, it will be understood by those skilled in the art that various changes may be made and equivalents may be substituted for elements thereof without departing from the scope of the invention as defined in the claims. In addition, many modifications may be made to adapt a particular situation or material to the teachings of the invention without departing from the essential scope thereof. Therefore, it is intended that the invention not be limited to the particular embodiment illustrated by the drawings and described in the specification as the best mode presently contemplated for carrying out this invention, but that the invention will include any embodiments falling within the description of the appended claims.

We claim:

1. A shifter assembly for a transmission, the shifter assembly comprising:
   a shift lever;
   a position sensor for sensing a position of the shift lever and producing a position signal in response thereto;
   a first mechanism having a plurality of detents, the first mechanism fixed in position relative to the shift lever; and
   a second mechanism fixed in position relative to the position sensor, the second mechanism engaging one of the plurality of detents;
   wherein engagement of the second mechanism with any of the plurality of detents inhibits relative movement between the shift lever and the position sensor.

2. The shifter assembly of claim 1, wherein the second mechanism includes a follower member which for engaging the plurality of detents.

3. The shifter assembly of claim 2, wherein the follower member is biased toward the plurality of detents by a spring.

4. The shifter assembly of claim 1, wherein the second mechanism includes a carrier arm and a plunger.

5. The shifter assembly of claim 1, wherein the second mechanism includes a cantilever arm and a roller.

6. The shifter assembly of claim 1, wherein the position sensor is a hall effect sensor.

7. A shifter assembly for a transmission, the shifter assembly comprising:
   a shifter mounting structure;
   a shift lever mounting bracket being fixedly coupled to the shifter mounting structure;
   a shift lever adapted for receiving a manual shift input from a vehicle operator, the shift lever being rotatably coupled to the shift lever mounting bracket;
   a positioning bracket fixedly coupled to the shifter mounting structure, the positioning bracket being generally U-shaped and including a contact surface into which a plurality of detents are formed;
   a follower mechanism fixedly coupled to the shift lever for rotation therewith, the follower mechanism including a carrier arm and a plunger, the plunger being biased outwardly away from the carrier arm and into engagement with the contact surface of the positioning bracket; and
   a position sensor fixedly coupled to the shifter mounting structure, the position sensor sensing a position of the shift lever and producing a position signal in response thereto;

wherein engagement of the plunger into any of the plurality of detents resists relative rotational movement between the shift lever and the shifter mounting structure.

8. The shifter assembly of claim 7, wherein the position sensor is a Hall-effect sensor.

9. A shifter assembly for a transmission, the shifter assembly comprising:

a shifter mounting structure;

a shift lever mounting bracket being fixedly coupled to the shifter mounting structure;

a shift lever adapted for receiving a manual shift input from a vehicle operator, the shift lever being rotatably coupled to the shift lever mounting bracket;

a positioning bracket fixedly coupled to the shift lever for rotation therewith, the positioning bracket being generally U-shaped and including a contact surface into which a plurality of detents are formed;

a follower mechanism having a spring and a follower member, the spring being coupled to the shifter mounting structure at a first end and coupled to the follower member at a second end, the spring biasing the follower member into engagement with the contact surface of the positioning bracket; and a position sensor fixedly coupled to the shifter mounting structure, the position sensor sensing a position of the shift lever and producing a position signal in response thereto;

wherein engagement of the plunger into any of the plurality of detents resists relative rotational movement between the shift lever and the shifter mounting structure.

10. The shifter assembly of claim 9, wherein the position sensor is a Hall-effect sensor.

* * * * *